US012655971B2

(12) United States Patent
Huang et al.

(10) Patent No.: US 12,655,971 B2
(45) Date of Patent: Jun. 16, 2026

(54) LIGHT EMITTING FAN DEVICE

(71) Applicant: Cooler Master Co., Ltd., Taipei City (TW)

(72) Inventors: Shau Jiun Huang, Taipei City (TW); Shi man Xu, Taipei City (TW)

(73) Assignee: COOLER MASTER CO., LTD., Taipei City (TW)

(*) Notice: Subject to any disclaimer, the term of this patent is extended or adjusted under 35 U.S.C. 154(b) by 399 days.

(21) Appl. No.: 18/510,786

(22) Filed: Nov. 16, 2023

(65) Prior Publication Data

US 2024/0159390 A1 May 16, 2024

(30) Foreign Application Priority Data

Nov. 16, 2022 (CN) ......................... 202223046002.3

(51) Int. Cl.
*F21V 33/00* (2006.01)
*F21V 15/04* (2006.01)

(52) U.S. Cl.
CPC .......... *F21V 33/0096* (2013.01); *F21V 15/04* (2013.01); *F21V 2200/20* (2015.01)

(58) Field of Classification Search
CPC ............................. F21V 33/0096; F21V 15/04
See application file for complete search history.

(56) References Cited

U.S. PATENT DOCUMENTS

| | | | | |
|---|---|---|---|---|
| 11,703,217 | B1 * | 7/2023 | Lin | F21V 33/0096 415/121.3 |
| 11,835,218 | B1 * | 12/2023 | Liao | F04D 25/06 |
| 2019/0249862 | A1 * | 8/2019 | Fan | F21V 17/12 |
| 2019/0331122 | A1 * | 10/2019 | Chen | F04D 19/005 |
| 2021/0199128 | A1 * | 7/2021 | Xu | F04D 29/601 |
| 2022/0049706 | A1 * | 2/2022 | Fan | F21V 33/0096 |
| 2025/0146493 | A1 * | 5/2025 | Cheng | F04D 29/005 |

* cited by examiner

*Primary Examiner* — Christopher E Dunay
(74) *Attorney, Agent, or Firm* — Merchant & Gould. P.C.

(57) ABSTRACT

A light emitting fan device including a main fan frame, fan assembly, first light guide ring, second light guide ring, light emitting assembly, and securing fan frame ring is provided. The main fan frame includes an inner annular side plate encompassing the fan assembly, and an outer annular side plate. The inner and the outer annular side plates define a mounting space therebetween. The light emitting assembly is disposed on the second light guide ring. The first light guide ring, second light guide ring, and securing fan frame ring are arranged at least partly in the mounting space. A second exterior light circumferential edge, second exterior side light surface, and elongated extended side light surface of the second light guide ring, and a first exterior light circumferential edge and first exterior side light surface of the first light guide ring are illuminated by the plurality of light sources.

15 Claims, 8 Drawing Sheets

LIGHT EMITTING FAN DEVICE

RELATED APPLICATIONS

This US application claims the benefit of priority to China application no. 202223046002.3, filed on Nov. 16, 2022, of which is incorporated herein by reference in its entirety.

TECHNICAL FIELD

The present disclosure is related to the field of heat transfer in general and more particularly but not limited to light emitting fan devices.

BACKGROUND OF THE INVENTION

With the increase of the processing speed and performance of electronic devices, such as central processing units (CPU), the amount of heat generated during operation of the electronic devices increases. The heat generation increases the temperature of the electronic device and, if the heat cannot be dissipated effectively, the reliability and performance of the electronic device is reduced. To prevent overheating of an electronic device, cooling apparatuses such as fans are used to efficiently dissipate the heat generated by the electronic device and, thereby ensure the standard operation of the electronic device.

In the case of fans or other rotating cooling apparatuses, lighting such as light-emitting diode (LED) lights, LED strip lights, or LED bar lights are assembled to the fans for illumination of the fans and electronic devices. However, to achieve illumination in different directions of the fan or via different surface areas of the fan, multiple parts and LED light sources are added, making maintenance, repair, and parts replacement inconvenient and inefficient.

SUMMARY OF THE INVENTION

The present disclosure provides a light emitting fan device including a main fan frame, a fan assembly, a first light guide ring, a second light guide ring, a light emitting assembly, a securing fan frame ring, and at least one anti-vibration mount. The fan assembly is rotatably disposed within the light emitting fan device. The at least one anti-vibration mount secures the securing fan frame ring to the main fan frame and limits vertical movement of the first light guide ring, the second light guide ring and the light emitting assembly, making maintenance, repair, and parts replacement more convenient and efficient. One light emitting assembly is implemented to emit light to at least five different surfaces of the light emitting fan device for illumination therefrom with minimal parts.

In at least one embodiment, the light emitting fan device includes a main fan frame, a fan assembly, a first light guide ring, a second light guide ring, a light emitting assembly, and a securing fan frame ring. The main fan frame includes a bottom plate, an inner annular side plate, an outer annular side plate, and at least one mount stop. The bottom plate has a stationary pillar disposed thereon. The inner annular side plate is connected to the bottom plate along an inner circumferential edge thereof. The inner annular side plate is connected to the outer annular side plate along an outer circumferential edge thereof opposite the inner circumferential edge via the at least one mount stop. The inner annular side plate defines a fan space therewithin and the inner annular side plate and the outer annular side plate define a mounting space therebetween opposite the fan space. The fan assembly includes a hub, and a plurality of fan blades radially extending from the hub. The fan assembly is rotatably disposed about the stationary pillar and in the fan space. The first light guide ring is arranged in the mounting space and on the at least one mount stop and the second light guide ring is arranged at least partly in the mounting space and on a first incident surface of the first light guide ring. The light emitting assembly is disposed on a second inner surface of the second light guide ring in the mounting space. The light emitting assembly includes a plurality of light sources configured to emit light that is directed toward a first exterior light circumferential edge and a first exterior side light surface of the first light guide ring and configured to emit light that is directed toward a second exterior light circumferential edge and a second exterior side light surface of the second light guide ring. The securing fan frame ring is arranged at least partly on the main fan frame and arranged flush with at least a part of the second exterior side light surface.

In at least one embodiment, the second light guide ring further includes a plurality of second interior concave depressions. The plurality of light sources is configured to illuminate the second exterior light circumferential edge and the second exterior side light surface via the plurality of second interior concave depressions. In at least one embodiment, the second light guide ring further includes an interior ledge along the second exterior light circumferential edge. The plurality of second interior concave depressions are disposed within the interior ledge. In at least one embodiment, the second light guide ring further includes at least one elongated extended side light surface and at least one protruding extended light surface, both, disposed on the second exterior side light surface. The plurality of light sources is configured to further illuminate the least one elongated extended side light surface and the at least one protruding extended light surface.

In at least one embodiment, the first light guide ring further includes a plurality of first interior concave depressions therewithin. The plurality of light sources is configured to illuminate the first exterior light circumferential edge and the first exterior side light surface via the plurality of first interior concave depressions.

In at least one embodiment, the light emitting assembly further includes a circuit board. The plurality of light sources is disposed on the circuit board. The circuit board does not contact the plurality of first interior concave depressions and the plurality of second interior concave depressions.

In at least one embodiment, the securing fan frame ring further includes at least one second extended light cutout, at least one second mounting cutout, and at least one second protruding part. The at least one second mounting cutout is disposed in contact with the at least one second extended light cutout on one side and the at least one second protruding part on an opposite side. The securing fan frame ring is arranged at least partly on the main fan frame via the at least one second protruding part. The securing fan frame ring is also arranged on the at least one elongated extended side light surface via the at least one second extended light cutout, and on the at least one protruding extended light surface via at least a part of the at least one second mounting cutout.

In at least one embodiment, the outer annular side plate further includes at least one first extended light cutout, at least one first mounting cutout, and at least one first protruding part. The at least one first mounting cutout is disposed in contact with the at least one first extended light cutout on one side and the at least one first protruding part on an opposite side. The main fan frame is arranged at least partly with the securing fan frame ring via the at least one first protruding part. The main fan frame is also arranged with the at least one elongated extended side light surface via the at least one first extended light cutout. The main fan frame is also arranged with the at least one protruding extended light surface via at least a part of the at least one first mounting cutout.

In at least one embodiment, the at least one protruding extended light surface is arranged between the at least one first protruding part and the at least one second protruding part. The at least one elongated extended side light surface is arranged along a side edge of at least one of the at least one first protruding part and the at least one second protruding part.

In at least one embodiment, the second exterior light circumferential edge is disposed opposite the plurality of second interior concave depressions, and the second exterior side light surface further includes a second exterior side light surface disposed connected to the second exterior light circumferential edge. The second exterior light circumferential edge and the second exterior side light surface are illuminated by the plurality of light sources.

In at least one embodiment, the first light guide ring further includes at least one mount stop cutout, and the first light guide ring is arranged on the at least one mount stop via the at least one mount stop cutout. In at least one embodiment, the first exterior light circumferential edge is disposed opposite the plurality of first interior concave depressions, and the first exterior side light surface further includes a first exterior side light surface disposed connected to the first exterior light circumferential edge. The first exterior light circumferential edge and the first exterior side light surface are illuminated by the plurality of light sources.

In at least one embodiment, the main fan frame further includes at least one first mount part disposed on a first exterior surface of the at least one first protruding part, and the securing fan frame ring includes at least one second mount part disposed on a second exterior surface of the at least one second protruding part. The at least one first mount part and the at least one second mount part are arranged along a parallel plane to the bottom plate. In at least one embodiment, the light emitting fan device further includes at least one anti-vibration mount disposed about the at least one first mount part and disposed about the at least one second mount part. The at least one anti-vibration mount is configured to limit vertical movement of the first light guide ring, the second light guide ring and the light emitting assembly. In at least one embodiment, the at least one anti-vibration mount is further configured to couple the securing fan frame ring to the main fan frame.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of light emitting fan devices incorporating aspects of the presently disclosed principles are illustrated by way of example, and not by way of limitation.

DETAILED DESCRIPTION

The following describes various principles related to thermal control of electronic components by way of reference to specific examples of light emitting fan devices, including specific arrangements and examples of main fan frames and securing fan frame rings embodying innovative concepts. More particularly, but not exclusively, such innovative principles are described in relation to selected examples of a mounting space, a plurality of interior concave depressions, an arrangement of a first light guide ring and a second light guide ring, and how light is illuminated to varied surface areas of the first light guide ring and the second light guide ring via the plurality of interior concave depressions, and well-known functions or constructions are not described in detail for purposes of succinctness and clarity. Nonetheless, one or more of the disclosed principles can be incorporated in various other embodiments of mounting spaces, plurality of interior concave depressions, first light guide rings, and second light guide rings to achieve any of a variety of desired outcomes, characteristics, and/or performance criteria.

Thus, light emitting fan devices having attributes that are different from those specific examples discussed herein can embody one or more of the innovative principles, and can be used in applications not described herein in detail. Accordingly, embodiments of light emitting fan devices not described herein in detail also fall within the scope of this disclosure, as will be appreciated by those of ordinary skill in the relevant art following a review of this disclosure.

Example embodiments as disclosed herein are directed to cooling systems. The cooling system may be configured on a chassis, within a chassis, or as part of an electric or electronics system that includes heat producing electronic components to be cooled. The cooling system includes at least one light emitting fan. The light emitting fan may be coupled to the chassis via a fastener (e.g., bolts, screws, an adhesive material, etc.), transporting air to heat producing electronic components to be cooled and/or to an outside of the chassis or electric or electronics system. The cooling system may further comprise one or more liquid-based cooling loops. The light emitting fans may be coupled to the back end of a radiator via a fastener at structural portions of the radiator, transporting air through the radiator to an air plenum or to the outside of the chassis or electric or electronics system.

Figure 1A:
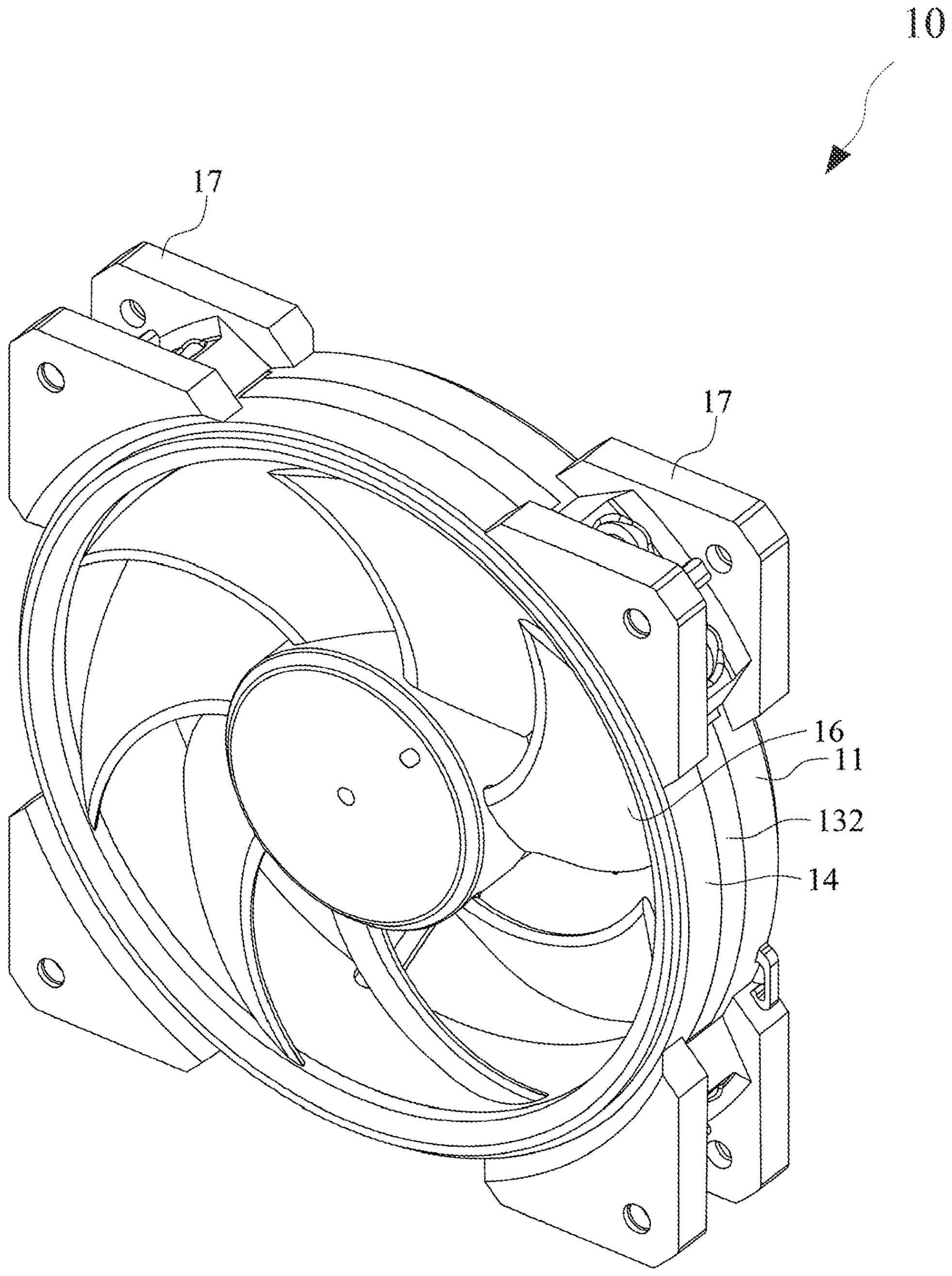
FIG. 1A is a perspective view of a light emitting fan device according to one embodiment of the present disclosure.
Figure 1B:
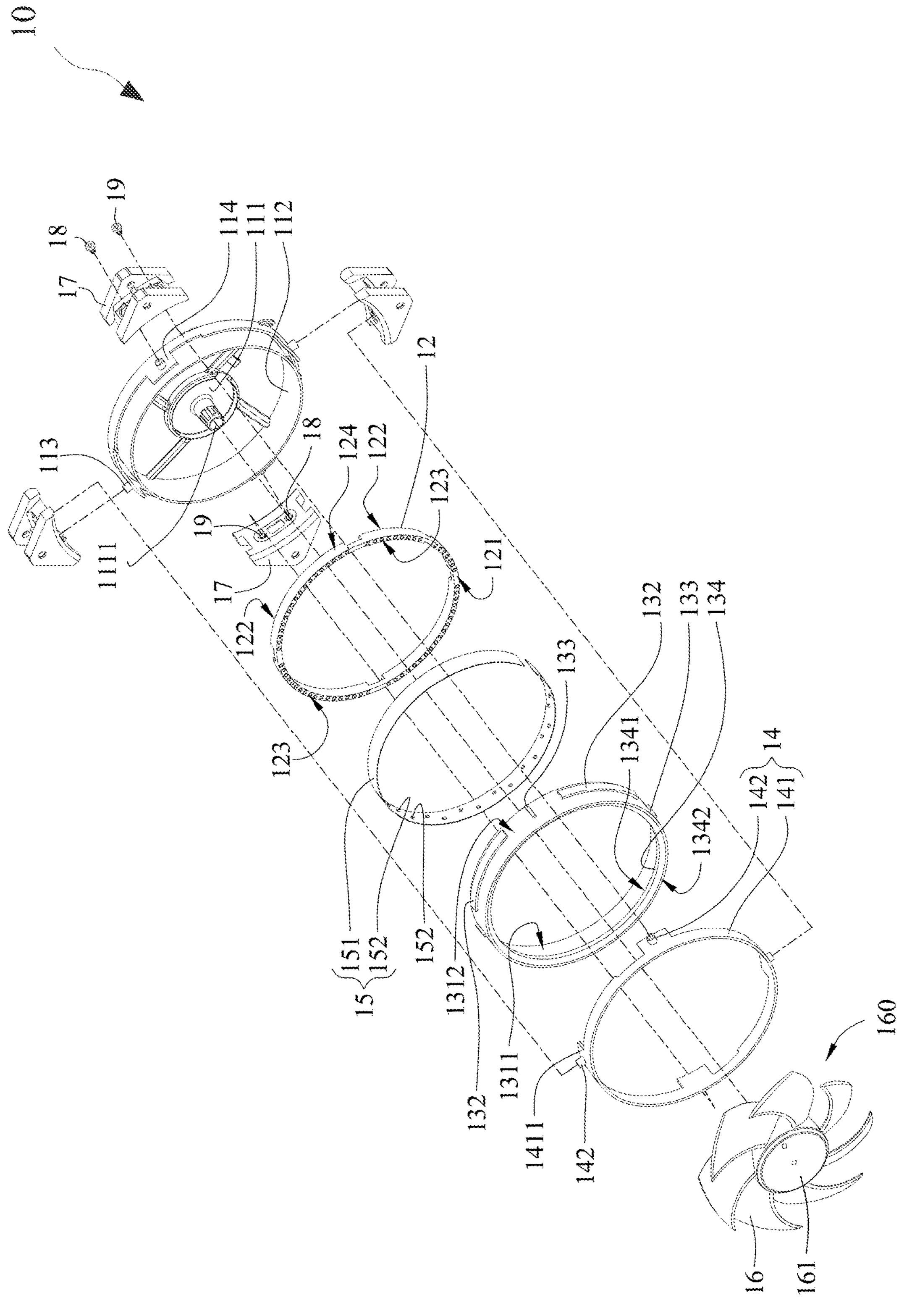
FIG. 1B is an exploded view of the light emitting fan device of FIG. 1 according to one embodiment of the present disclosure.
Figure 1C:
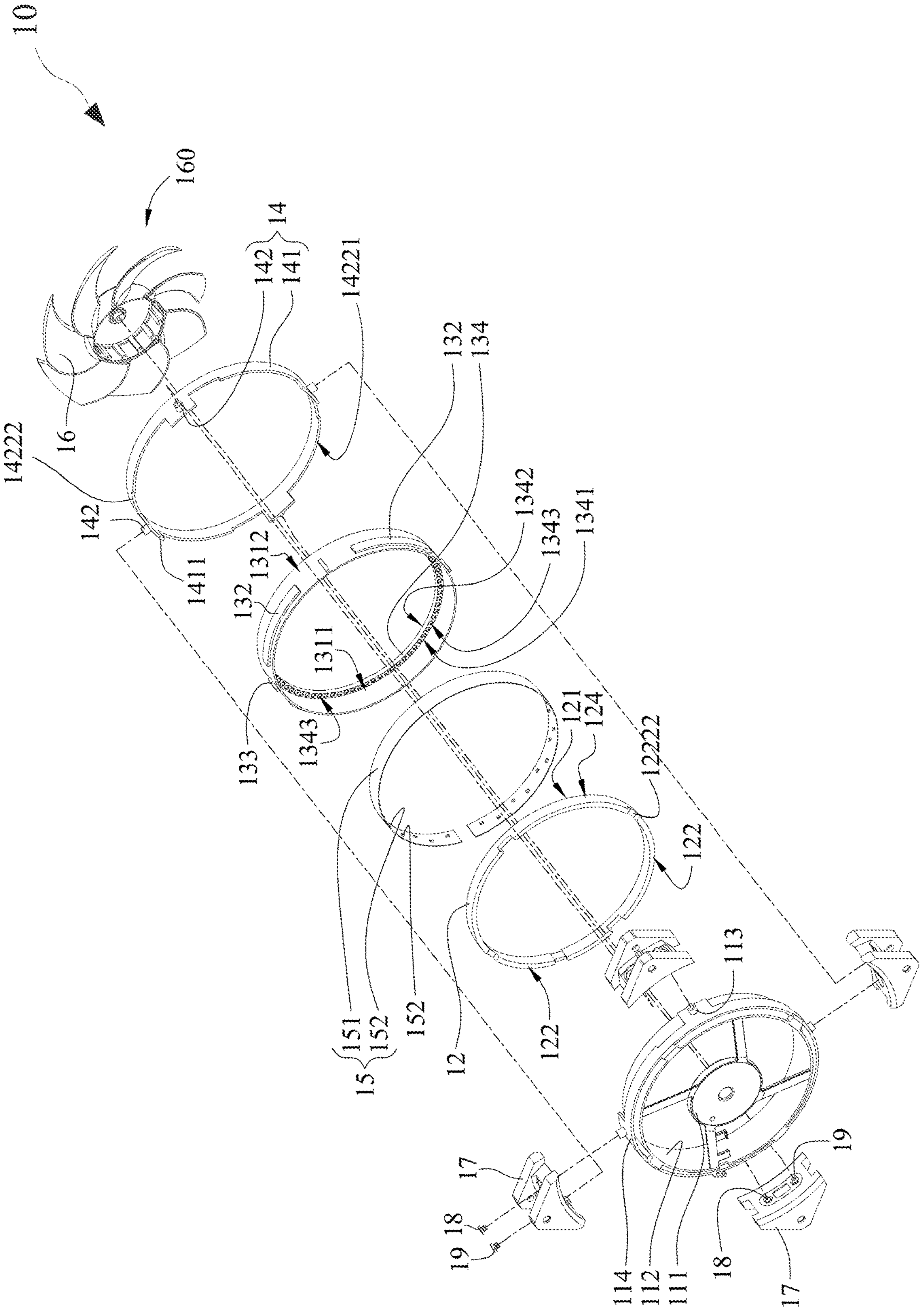
FIG. 1C is another exploded view of the light emitting fan device of FIG. 1 according to one embodiment of the present disclosure.

FIGS. 1A to 1C include at least one embodiment of a light emitting fan device 10. The light emitting fan device 10 includes a main fan frame 11, a fan assembly 160, a first light guide ring 12, a second light guide ring 13, a light emitting assembly 15, and a securing fan frame ring 14. The main fan frame 11 includes a bottom plate 111, an inner annular side plate 112, an outer annular side plate 114, and at least one mount stop 1123. The bottom plate 111 can be circular shaped and have a stationary pillar 1111 disposed vertically thereon. The inner annular side plate 112 can be connected to the bottom plate 111 along an inner circumferential edge thereof via at least one elongated rectangular structure connected therebetween. A diameter of the bottom plate 111 can be less than a diameter of the inner annular side plate 112. The inner annular side plate 112 is connected to the outer annular side plate 114 along an outer circumferential edge thereof opposite the inner circumferential edge via the at least one mount stop 1123 connected therebetween. The at least one mount stop 1123 can be rectangular shaped. The inner annular side plate 112 includes an inner annular side plate surface 1121 defining a fan space therewithin and the inner annular side plate 112 and the outer annular side plate 114 define a mounting space 1124 therebetween opposite the fan space. The fan assembly 160 includes a hub 161 and a plurality of fan blades 16 radially extending from the hub 161. The fan assembly 160 is rotatably disposed about the stationary pillar 1111 and secured in the fan space. A geometric shape of the fan assembly 160 corresponds to a geometric shape of the fan space. The first light guide ring 12 is arranged in the mounting space 1124 and on the at least one mount stop 1123 and the second light guide ring 13 is arranged at least partly in the mounting space 1124 and on a first incident surface 121 of the first light guide ring 12. The light emitting assembly 15 is disposed on a second inner surface 1311 of the second light guide ring 13 in the mounting space 1124. The light emitting assembly 15 includes a plurality of light sources 152 configured to emit light that is directed toward a first exterior light circumferential edge 122 and a first exterior side light surface 124 of the first light guide ring 12 and configured to emit light that is directed toward a second exterior light circumferential edge 1342 and a second exterior side light surface 1312 of the second light guide ring 13. The securing fan frame ring 14 is arranged at least partly on the main fan frame 11 and arranged flush with at least a part of the second exterior side light surface 1312.

In at least one embodiment, the second light guide ring 13 further includes a plurality of second interior concave depressions 1343. The plurality of second interior concave depressions 1343 can be funnel-like shaped. The plurality of light sources 152 is configured to illuminate the second exterior light circumferential edge 1342 and the second exterior side light surface 1312 via the plurality of second interior concave depressions 1343. In at least one embodiment, the second light guide ring 13 further includes an interior ledge 134 along the second exterior light circumferential edge 1342. The plurality of second interior concave depressions 1343 are disposed within the interior ledge 134 via a second incident surface 1341 of the ledge 134. In at least one embodiment, the second light guide ring 13 further includes at least one elongated extended side light surface 132 and at least one protruding extended light surface 133, both, disposed on the second exterior side light surface 1312. The at least one elongated extended side light surface 132 can be a rectangular-like shape and the at least one protruding extended light surface 133 can be an elongated rectangular shape. The plurality of light sources 152 is configured to further illuminate the least one elongated extended side light surface 132 and the at least one protruding extended light surface 133.

In at least one embodiment, the first light guide ring 12 further includes a plurality of first interior concave depressions 123 therewithin a first incident surface 121 of the first light guide ring 12. The plurality of first interior concave depressions 123 can be funnel-like shaped. The plurality of light sources 152 is configured to illuminate the first exterior light circumferential edge 122 and the first exterior side light surface 124 via the plurality of first interior concave depressions 123.

In at least one embodiment, the light emitting assembly 15 further includes a circuit board 151. The plurality of light sources 152 is, for example, light emitting diodes, and is disposed on a side of the circuit board 151 opposite the second inner surface 1311. The circuit board 151 is, for example, a flexible printed circuit board, and does not contact the plurality of first interior concave depressions 123 and the plurality of second interior concave depressions 1343. In at least one embodiment, a circumferential edge of the circuit board 151 is arranged along a same plane to an inner annular side plate circumferential edge 11212 of the inner annular side plate 112.

In at least one embodiment, the securing fan frame ring 14 further includes at least one second extended light cutout 14221, at least one second mounting cutout 14222, and at least one second protruding part 1411. The at least one second mounting cutout 14222 is disposed in contact with the at least one second extended light cutout 14221 on one side and the at least one second protruding part 1411 on an opposite side. The securing fan frame ring 14 is arranged at least partly on the main fan frame 11 via the at least one second protruding part 1411. The securing fan frame ring 14 is also arranged on the at least one elongated extended side light surface 132 via the at least one second extended light cutout 14221, and on the at least one protruding extended light surface 133 via at least a part of the at least one second mounting cutout 14222.

Figure 2A:
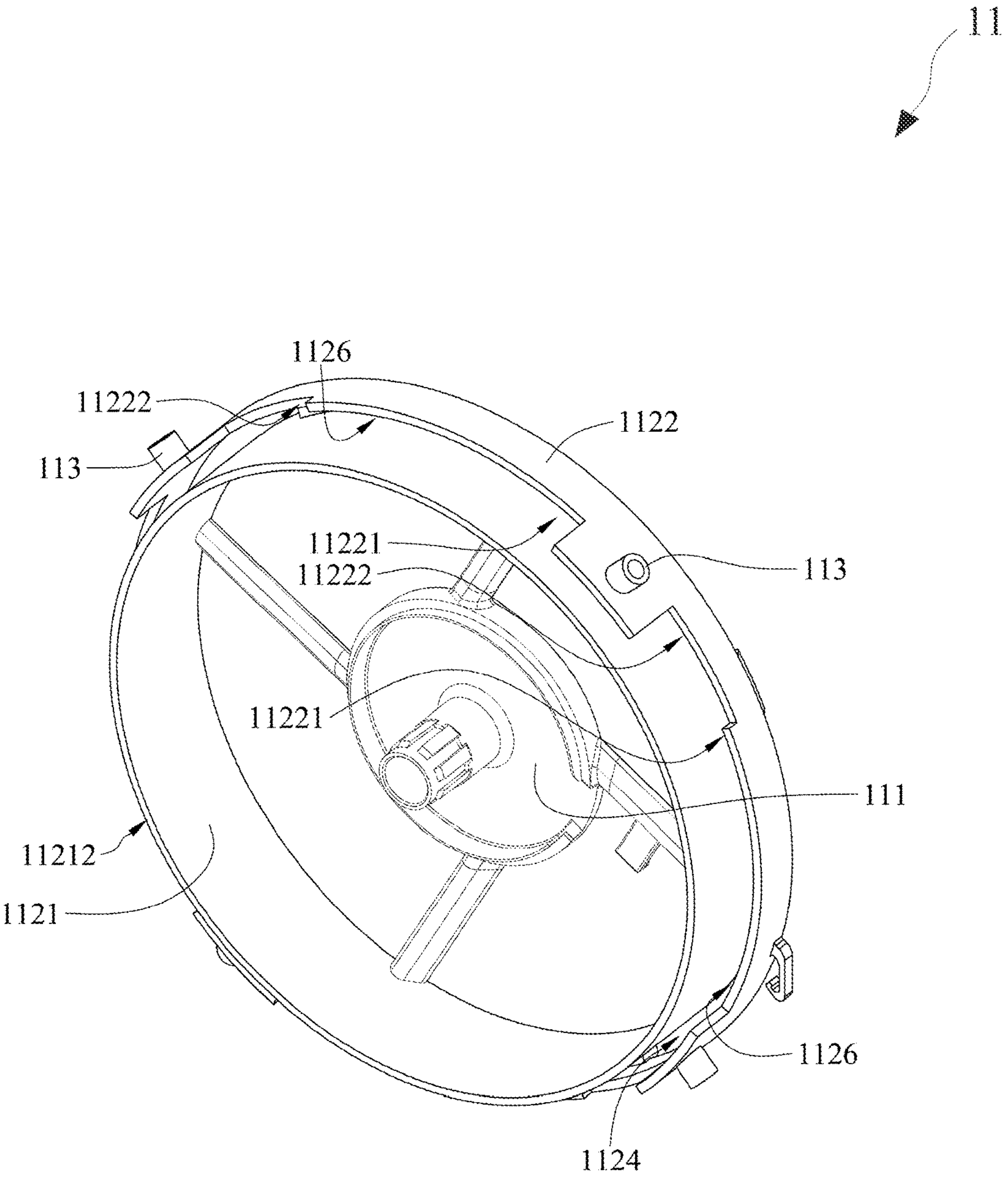
FIG. 2A is a perspective view of a main fan frame of the light emitting fan device of FIGS. 1A to 1C according to one embodiment of the present disclosure.
Figure 2B:
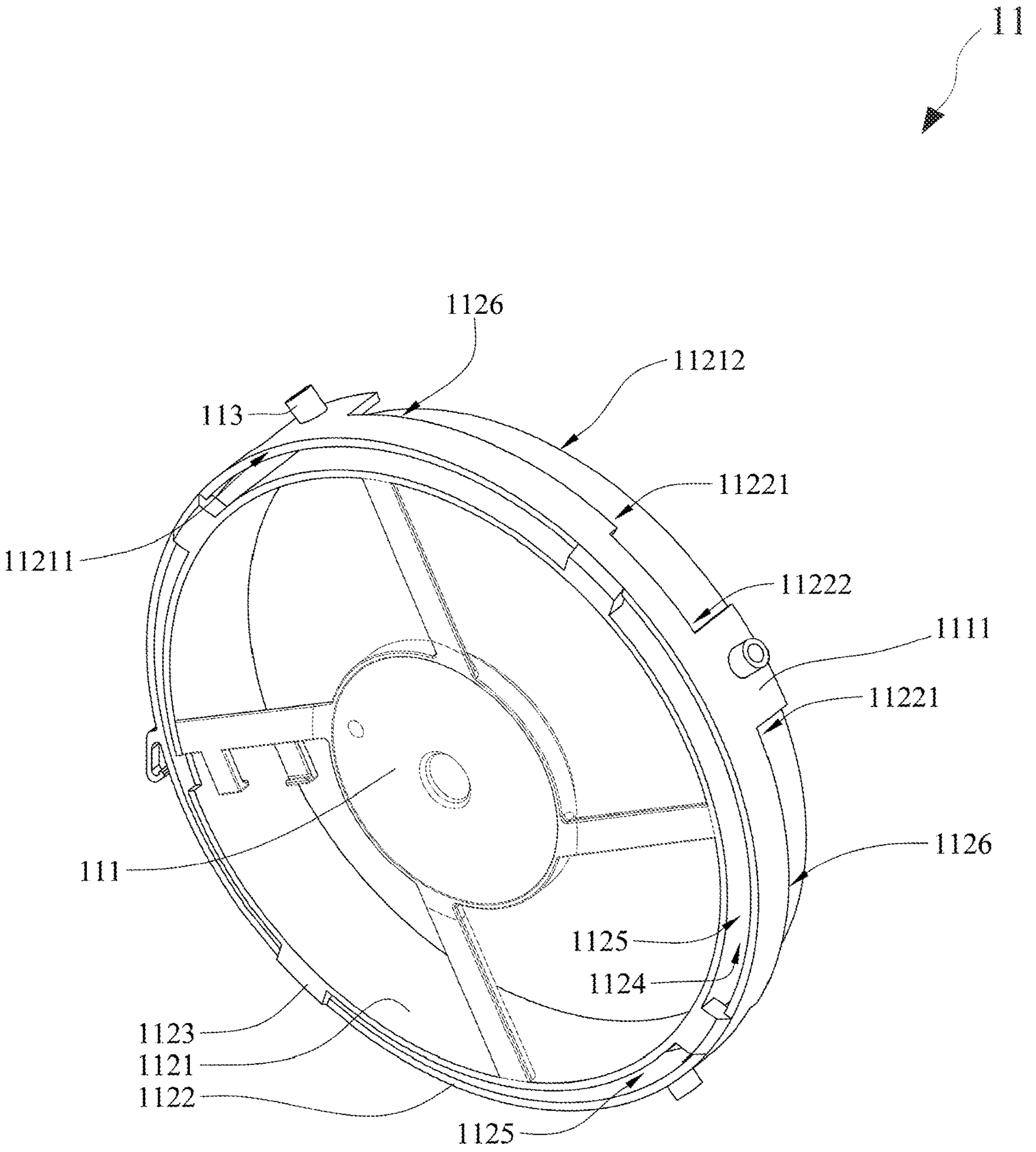
FIG. 2B is another perspective view of the main fan frame of the light emitting fan device of FIG. 2A according to one embodiment of the present disclosure.

FIGS. 2A and 2B include at least one embodiment of a main fan frame 11 having the outer annular side plate 114. The outer annular side plate 114 further includes at least one first extended light cutout 11221, at least one first mounting cutout 11222, and at least one first protruding part 1111. The at least one first mounting cutout 11222 is disposed in contact with the at least one first extended light cutout 11221 on one side and the at least one first protruding part 1111 on an opposite side. The main fan frame 11 is arranged at least partly with the securing fan frame ring 14 via the at least one first protruding part 1111. The main fan frame 11 is also arranged with the at least one elongated extended side light surface 132 via the at least one first extended light cutout 11221. The main fan frame 11 is also arranged with the at least one protruding extended light surface 133 via at least a part of the at least one first mounting cutout 11222.

In at least on embodiment, the at least one first extended light cutout 11221 and at least one first protruding part 1111, and the at least one second extended light cutout 14221 and at least one second protruding part 1411 are configured to surround the at least one elongated extended side light surface 132 so that illumination of the surface areas of the at least one elongated extended side light surface 132 can be implemented, resulting in central stripped illumination of the light emitting fan device 10.

In at least one embodiment, the at least one protruding extended light surface 133 is arranged between the at least one first protruding part 1111 and the at least one second protruding part 1411. The at least one elongated extended side light surface 132 is arranged along a side edge of at least one of the at least one first protruding part 1111 and the at least one second protruding part 1411.

In at least one embodiment, the second exterior light circumferential edge 1342 is disposed opposite the plurality of second interior concave depressions 1343, and the second exterior side light surface 1312 further includes a second exterior side light surface 1312 disposed connected to the second exterior light circumferential edge 1342. The second exterior light circumferential edge 1342 and the second exterior side light surface 1312 are illuminated by the plurality of light sources 152.

In at least one embodiment, the second exterior light circumferential edge 1342 is defined by the securing fan frame ring 14 surpassing a second exterior light circumferential edge 1342 of the second light guide ring 13.

In at least one embodiment, the first light guide ring 12 further includes at least one mount stop cutout 12222, and the first light guide ring 12 is arranged on the at least one mount stop 1123 via the at least one mount stop cutout 12222 arranged through a first interior light opening 1123 of the mounting space 1224 to at least one first exterior light opening 1125 of the mounting space 1224 opposite the first interior light opening 1123. In at least one embodiment, the first exterior light circumferential edge 122 is disposed opposite the plurality of first interior concave depressions 123, and the first exterior side light surface 124 further includes a first exterior side light surface 124 disposed connected to the first exterior light circumferential edge 122. The first exterior light circumferential edge 122 and the first exterior side light surface 124 are illuminated by the plurality of light sources 152.

In at least one embodiment, the first exterior light circumferential edge 122 is defined by at least a part of a circumferential edge of the first light guide ring 12 extending past the at least one mount stop 1123 and extending past an outer annular side plate circumferential edge 11211 of the outer annular side plate 114.

In at least one embodiment, the main fan frame 11 further includes at least one first mount part 113 disposed on a first exterior surface 1122 of the at least one first protruding part 1111, and the securing fan frame ring 14 includes at least one second mount part 142 disposed on a second exterior surface 141 of the at least one second protruding part 1411. The at least one first mount part 113 and the at least one second mount part 142 are arranged along a parallel plane to the bottom plate 111. In at least one embodiment, the light emitting fan device 10 further includes at least one anti-vibration mount 17 disposed about the at least one first mount part 113 and disposed about the at least one second mount part 142. The at least one anti-vibration mount 17 is configured to limit vertical movement of the first light guide ring 12, the second light guide ring 13 and the light emitting assembly 15. In at least one embodiment, the at least one anti-vibration mount 17 is further configured to couple the securing fan frame ring 14 to the main fan frame 11. In at least one embodiment, the at least one anti-vibration mount 17 couples the securing fan frame ring 14 to the main fan frame 11 via at least one first mount fastener 18 fastened to the first mount part 113 and via at least one second mount fastener 19 fastened to the second mount part 142. The first mount fastener 18 and the second mount fastener 19 can be, as an example, bolts or screws.

In at least one embodiment, the at least one elongated extended side light surface 132 and the at least one protruding extended light surface 133 are configured so that vertical and horizontal movement of the first light guide ring 12, the second light guide ring 13 and the light emitting assembly 15 is limited when the securing fan frame ring 14 is coupled to the main fan frame 11.

Figure 3A:
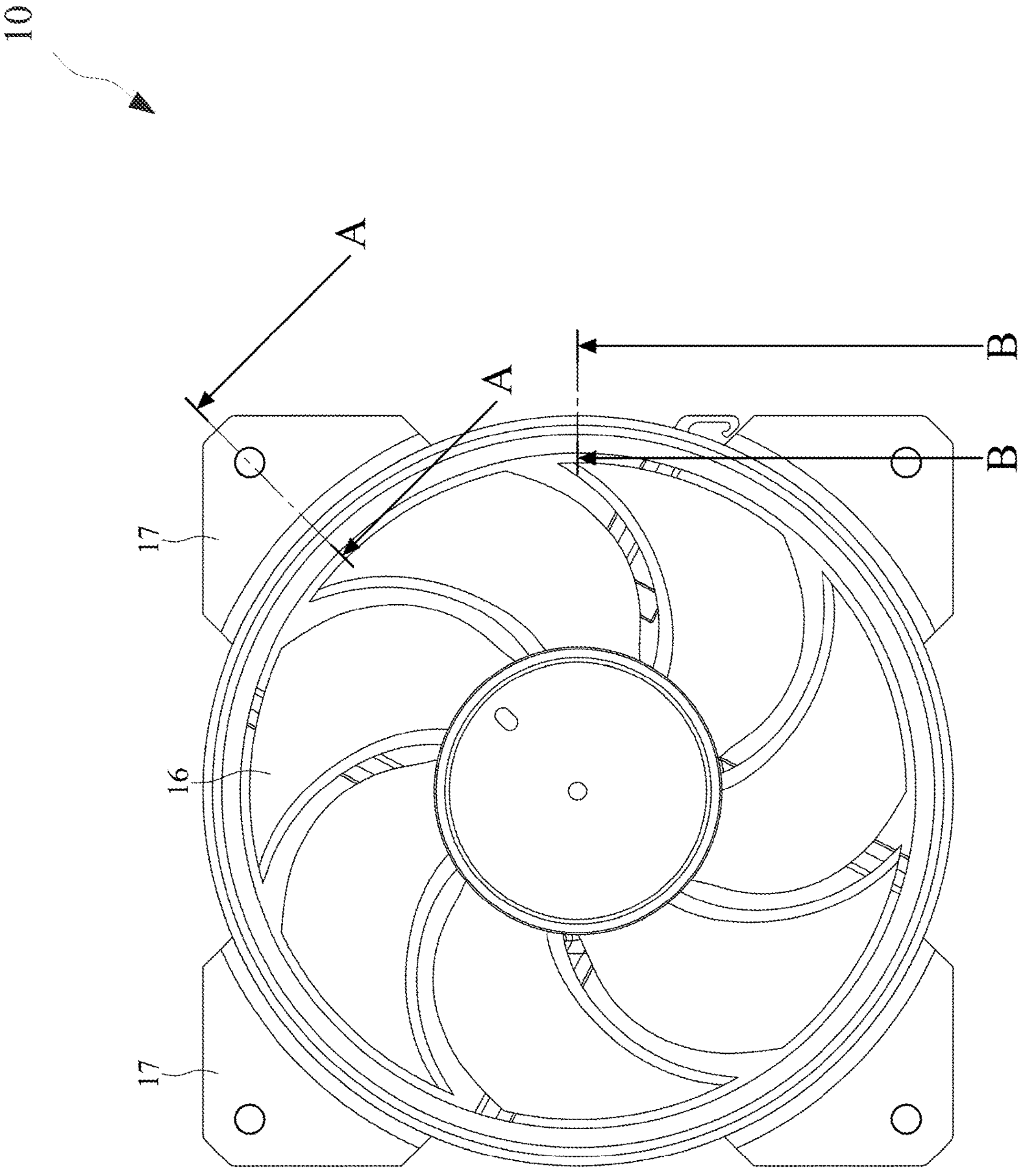
FIG. 3A is another perspective view of the light emitting fan device of FIGS. 1A to 1C according to one embodiment of the present disclosure.
Figure 3B:
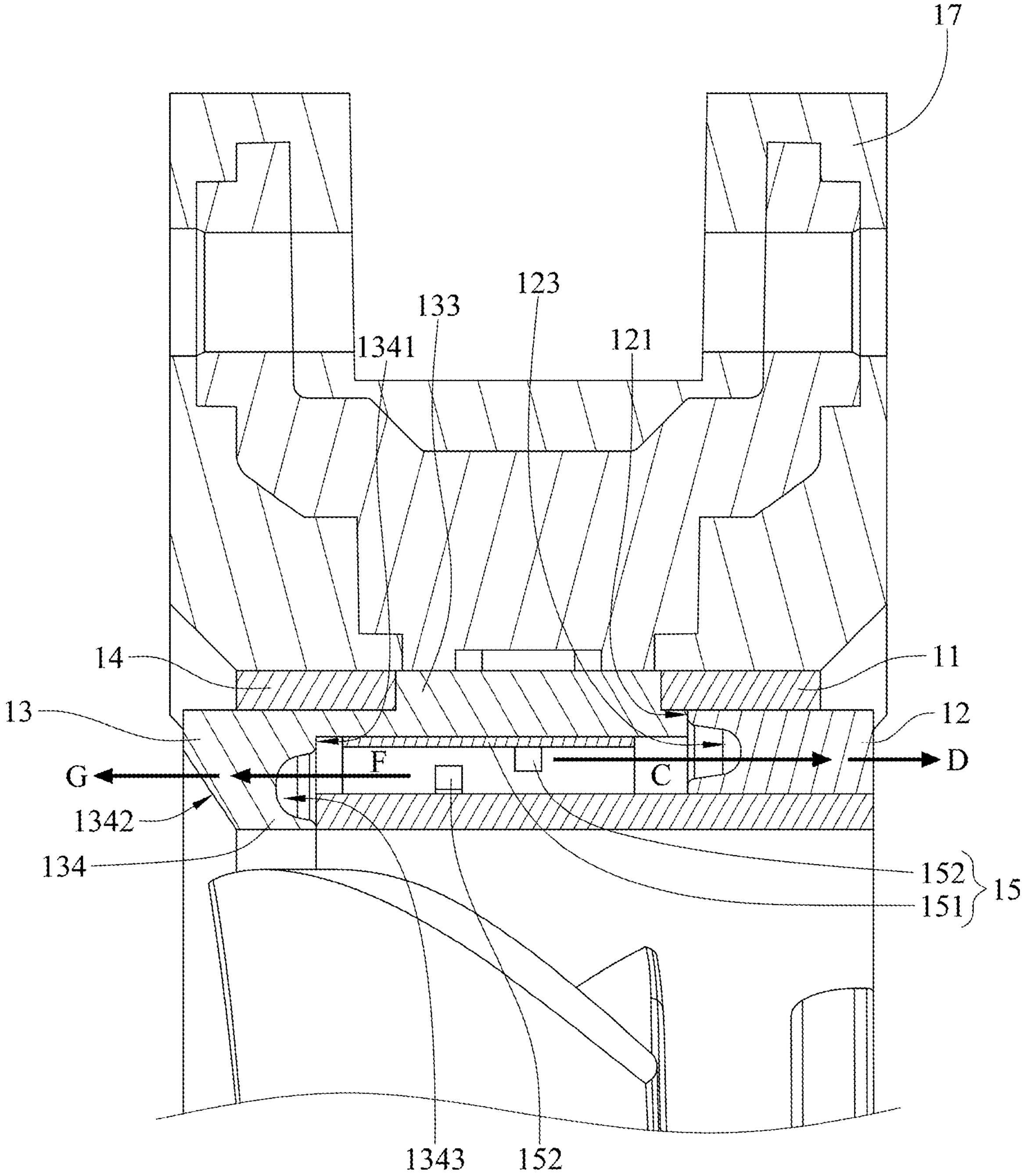
FIG. 3B is a cross-sectional view of section line AA of the light emitting fan device of FIG. 3A illustrating directional illumination according to one embodiment of the present disclosure.
Figure 3C:
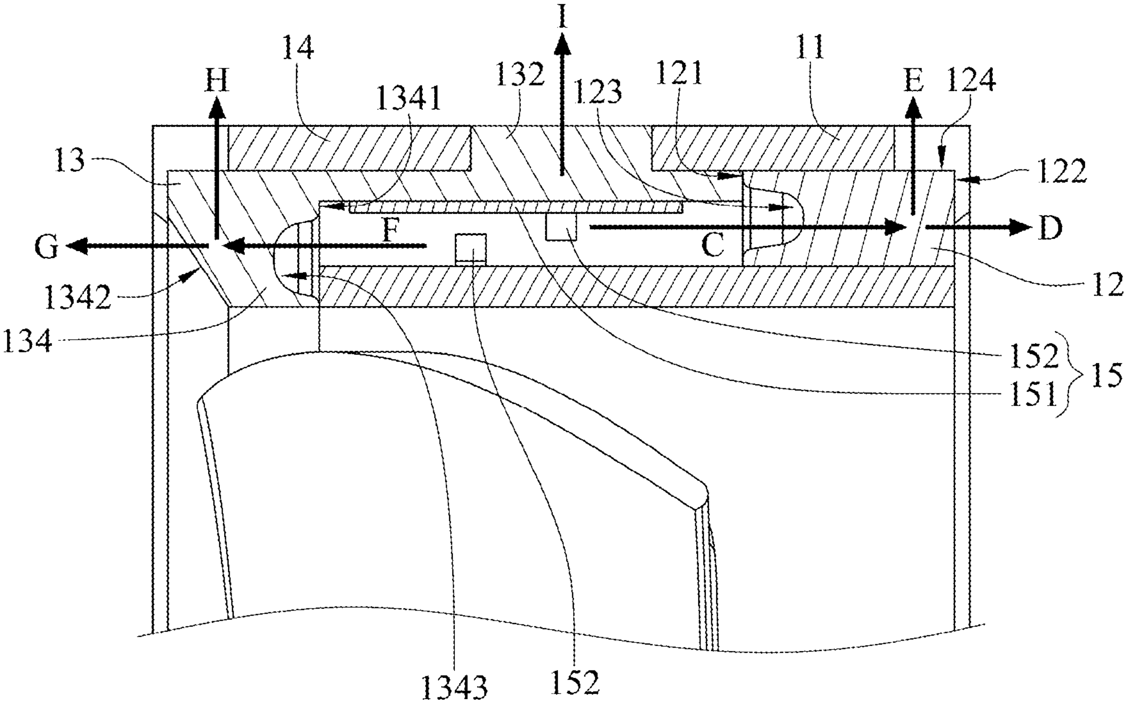
FIG. 3C is a cross-sectional view of section line BB of the light emitting fan device of FIG. 3A illustrating directional illumination according to one embodiment of the present disclosure.

FIGS. 3B to 3C are cross-sectional views of a directional illumination implementation of the light emitting fan device 10 of FIG. 3A. In operation, emitted light F, C is provided to the second exterior light circumferential edge 1342, the second exterior side light surface 1312, and the at least one elongated extended side light surface 132 of the second light guide ring 13, and the first exterior light circumferential edge 122 and the first exterior side light surface 124 of the first light guide ring 12 by the plurality of light sources 152 disposed on the circuit board 151 arranged in the mounting space 1124 and not contacting the plurality of first interior concave depressions 123 and the plurality of second interior concave depressions 1343. The emitted light F travels through the plurality of second interior concave depressions 1343 to illuminate the surface areas of the second exterior light circumferential edge 1342 G, the second exterior side light surface 1312 H, and the at least one elongated extended side light surface 132 I. The emitted light C travels through the plurality of first interior concave depressions 123 to illuminate the surface areas of the first exterior light circumferential edge 122 D, and the first exterior side light surface 124 E. Thus, providing directional illumination in at least three directions and via at least five different surface areas G (1st direction) and D (2nd direction), and H, I, and E (3rd direction) of the light emitting fan device 10. In at least one embodiment, for the emitted light F to travel through the plurality of second interior concave depressions 1343 to illuminate the surface areas of the second exterior light circumferential edge 1342, G, the second exterior side light surface 1312, H, and the at least one elongated extended side light surface 132, I and for the emitted light C to travel through the plurality of first interior concave depressions 123 to illuminate the surface areas of the first exterior light circumferential edge 122, D, and the first exterior side light surface 124, E, the second light guide ring 13 and the first light guide ring 12 can be made of light-permeable material.

In at least one embodiment, the emitted light F also travels through the plurality of second interior concave depressions 1343 to the surface areas of the at least one protruding extended light surface 133. Illumination however, is at least partly blocked by the at least one anti-vibration mount 17 disposed about the at least one first mount part 113 of the main fan frame 11 and the at least one second mount part 142 of the securing fan frame ring 14.

The directional illumination of the light emitting fan device 10 in at least three directions and via at least five different surface areas G (1st direction) and D (2nd direction), and H, I, and E (3rd direction) is implemented at least in part via the plurality of light sources 152 disposed on one circuit board 151, formation of the mounting space 1124, the plurality of first interior concave depressions 123 and the plurality of second interior concave depressions 1343, the at least one elongated extended side light surface 132, the at least a part of the circumferential edge of the first light guide ring 12 extending past the outer annular side plate 114, and the securing fan frame ring 14 surpassing the circumferential edge of the second light guide ring 13. The at least one anti-vibration mount 17 disposed about the at least one first mount part 113 and the at least one second mount part 142 not only limits vertical movement of the first light guide ring 12, the second light guide ring 13 and the light emitting assembly 15, but also couples the securing fan frame ring 14 to the main fan frame 11 providing for more convenient and efficient maintenance, repair, and parts replacement. The light emitting assembly 15 disposed on the second inner surface 1311 of the second light guide ring 13 in the mounting space 1124 and the plurality of first interior concave depressions 123 and the plurality of second interior concave depressions 1343 enhances light emission for illumination without additional light emitting assemblies. The at least a part of a circumferential edge of the first light guide ring 12 extending past the outer annular side plate 114, and the securing fan frame ring 14 surpassing a circumferential edge of the second light guide ring 13 provides two additional surface areas for illumination of light. The at least one elongated extended side light surface 132 not only limits vertical and horizontal movement of the first light guide ring 12, the second light guide ring 13 and the light emitting assembly 15, the at least one elongated extended side light surface 132 also provides a central stripped illumination of the light emitting fan device 10, minimizing parts while increasing varied illumination surface areas.

In at least one embodiment, the interior ledge 134 is configured so that a greater amount of emitted light F travels through the plurality of second interior concave depressions 1343 to illuminate the at least one elongated extended side light surface 132 at a further distance when compared to the emitted light C travelling through the plurality of first interior concave depressions 123. From a cross-sectional view, the a central axis of the second interior concave depression is offset from a center axis of the first interior concave depression.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A light emitting fan device, comprising:

a main fan frame including a bottom plate, an inner annular side plate, an outer annular side plate, and at least one mount stop, the bottom plate having a stationary pillar disposed thereon, the inner annular side plate connected to the bottom plate along an inner circumferential edge thereof, the inner annular side plate connected to the outer annular side plate along an outer circumferential edge thereof opposite the inner circumferential edge via the at least one mount stop, the inner annular side plate defining a fan space, the inner annular side plate and the outer annular side plate defining a mounting space therebetween opposite the fan space, a fan assembly including a hub and a plurality of fan blades radially extending from the hub, the fan assembly rotatably disposed about the stationary pillar and in the fan space, a first light guide ring arranged in the mounting space and on the at least one mount stop, a second light guide ring arranged at least partly in the mounting space and on a first incident surface of the first light guide ring, a light emitting assembly disposed on a second inner surface of the second light guide ring in the mounting space, the light emitting assembly including a plurality of light sources configured to emit light that is directed toward a first exterior light circumferential edge and a first exterior side light surface of the first light guide ring and configured to emit light that is directed toward a second exterior light circumferential edge and a second exterior side light surface of the second light guide ring, and a securing fan frame ring arranged at least partly on the main fan frame and arranged flush with at least a part of the second exterior side light surface.

2. The light emitting fan device of claim 1, wherein the second light guide ring further includes at least one elongated extended side light surface and at least one protruding extended light surface, both, disposed on the second exterior side light surface, and wherein the plurality of light sources is configured to further illuminate the least one elongated extended side light surface and the at least one protruding extended light surface.

3. The light emitting fan device of claim 2, wherein the first light guide ring further includes a plurality of first interior concave depressions therewithin, and wherein the plurality of light sources is configured to illuminate the first exterior light circumferential edge and the first exterior side light surface via the plurality of first interior concave depressions.

4. The light emitting fan device of claim 3, wherein the first exterior light circumferential edge is disposed opposite the plurality of first interior concave depressions, and wherein the first exterior side light surface further includes a first exterior side light surface disposed connected to the first exterior light circumferential edge, whereby the first exterior light circumferential edge and the first exterior side light surface are illuminated by the plurality of light sources.

5. The light emitting fan device of claim 3, wherein the second light guide ring further includes a plurality of second interior concave depressions therewithin, and wherein the plurality of light sources is configured to illuminate the second exterior light circumferential edge and the second exterior side light surface via the plurality of second interior concave depressions.

6. The light emitting fan device of claim 5, wherein the second light guide ring further includes an interior ledge along the second exterior light circumferential edge, and wherein the plurality of second interior concave depressions are disposed within the interior ledge.

7. The light emitting fan device of claim 5, wherein the second exterior light circumferential edge is disposed opposite the plurality of second interior concave depressions, and wherein the second exterior side light surface further includes a second exterior side light surface disposed connected to the second exterior light circumferential edge, whereby the second exterior light circumferential edge and the second exterior side light surface are illuminated by the plurality of light sources.

8. The light emitting fan device of claim 5, wherein the light emitting assembly further includes a circuit board and the plurality of light sources is disposed on the circuit board, and wherein the circuit board does not contact the plurality of first interior concave depressions and the plurality of second interior concave depressions.

9. The light emitting fan device of claim 2, wherein the securing fan frame ring further includes at least one second extended light cutout, at least one second mounting cutout, and at least one second protruding part, and the at least one second mounting cutout is disposed in contact with the at least one second extended light cutout on one side and is disposed in contact with the at least one second protruding part on an opposite side, and wherein the securing fan frame ring is arranged at least partly on the main fan frame via the at least one second protruding part, and is also arranged on the at least one elongated extended side light surface via the at least one second extended light cutout, and is also arranged on the at least one protruding extended light surface via at least a part of the at least one second mounting cutout.

10. The light emitting fan device of claim 9, wherein the outer annular side plate further includes at least one first extended light cutout, at least one first mounting cutout, and at least one first protruding part, and the at least one first mounting cutout is disposed in contact with the at least one first extended light cutout on one side and disposed in contact with the at least one first protruding part on an opposite side, and wherein the main fan frame is arranged at least partly with the securing fan frame ring via the at least one first protruding part, and is also arranged with the at least one elongated extended side light surface via the at least one first extended light cutout, and is also arranged with the at least one protruding extended light surface via at least a part of the at least one first mounting cutout.

11. The light emitting fan device of claim 10, wherein the at least one protruding extended light surface is arranged between the at least one first protruding part and the at least one second protruding part, and wherein the at least one elongated extended side light surface is arranged along a side edge of at least one of the at least one first protruding part and the at least one second protruding part.

12. The light emitting fan device of claim 11, wherein the main fan frame further includes at least one first mount part disposed on a first exterior surface of the at least one first protruding part, and the securing fan frame ring includes at least one second mount part disposed on a second exterior surface of the at least one second protruding part, and wherein the at least one first mount part and the at least one second mount part are arranged along a parallel plane to the bottom plate.

13. The light emitting fan device of claim 12, further comprising at least one anti-vibration mount disposed about the at least one first mount part and disposed about the at least one second mount part, wherein the at least one anti-vibration mount is configured to limit vertical movement of the first light guide plate, the second light guide plate and the light emitting assembly.

14. The light emitting fan device of claim 13, wherein the at least one anti-vibration mount is further configured to couple the securing fan frame ring to the main fan frame.

15. The light emitting fan device of claim 9, wherein the first light guide ring further includes at least one mount stop cutout, and the first light guide ring is arranged on the at least one mount stop via the at least one mount stop cutout.

* * * * *